United States Patent
Wang et al.

(10) Patent No.: US 10,740,927 B2
(45) Date of Patent: Aug. 11, 2020

(54) METHOD AND DEVICE FOR VEHICLE IDENTIFICATION

(71) Applicant: PING AN TECHNOLOGY (SHENZHEN) CO., LTD., Shenzhen, Guangdong (CN)

(72) Inventors: Jianzong Wang, Shenzhen (CN); Jing Xiao, Shenzhen (CN)

(73) Assignee: Ping An Technology (Shenzhen) Co., Ltd., Shenzhen (CN)

(*) Notice: Subject to any disclaimer, the term of this patent is extended or adjusted under 35 U.S.C. 154(b) by 125 days.

(21) Appl. No.: 16/092,746

(22) PCT Filed: Jan. 31, 2018

(86) PCT No.: PCT/CN2018/074878
§ 371 (c)(1),
(2) Date: Oct. 10, 2018

(87) PCT Pub. No.: WO2018/149302
PCT Pub. Date: Aug. 23, 2018

(65) Prior Publication Data
US 2019/0139262 A1    May 9, 2019

(30) Foreign Application Priority Data
Feb. 16, 2017  (CN) .......................... 2017 1 0083593

(51) Int. Cl.
*G06K 9/62*  (2006.01)
*G06T 7/90*  (2017.01)
(Continued)

(52) U.S. Cl.
CPC ............ *G06T 7/90* (2017.01); *G06K 9/00771* (2013.01); *G06K 9/00825* (2013.01);
(Continued)

(58) Field of Classification Search
CPC ............ G06T 7/90; G06T 2207/20081; G06T 2207/20084; G06K 9/6271;
(Continued)

(56) References Cited

U.S. PATENT DOCUMENTS

| | | | |
|---|---|---|---|
| 2017/0032222 A1* | 2/2017 | Sharma | G06K 9/6256 |
| 2017/0243479 A1* | 8/2017 | Hill | G08B 13/1672 |
| 2018/0373859 A1* | 12/2018 | Ganong | G06F 21/32 |

FOREIGN PATENT DOCUMENTS

| | | |
|---|---|---|
| CN | 104361359 | 2/2015 |
| CN | 105184271 | 12/2015 |

(Continued)

OTHER PUBLICATIONS

International Search Report for International Application No. PCT/CN2018/074878 dated May 4, 2018, 2 pages.

*Primary Examiner* — Dhaval V Patel
(74) *Attorney, Agent, or Firm* — Loza & Loza, LLP; Michael F. Fedrick

(57) ABSTRACT

The present application provides a method and device for vehicle identification, the method comprises: obtaining a first vehicle image and a second vehicle image, wherein the first vehicle image comprises a first vehicle, and the second vehicle image comprises a second vehicle; extracting a first color feature and a first vehicle type feature of the first vehicle, and extracting a second color feature and a second vehicle type feature of the second vehicle based on a convolutional neural network model; combining the first color feature and the first vehicle type feature into a first vehicle feature, and combining the second color feature and the second vehicle type feature into a second vehicle feature; calculating a similarity parameter between the first vehicle feature and the second vehicle feature; and determining (Continued)

whether the first vehicle is the same one as the second vehicle according to the similarity parameter.

8 Claims, 4 Drawing Sheets

(51) Int. Cl.
    *G06Q 40/08*     (2012.01)
    *G06K 9/00*     (2006.01)
    *G06N 3/04*     (2006.01)

(52) U.S. Cl.
    CPC ......... *G06K 9/6247* (2013.01); *G06K 9/6271* (2013.01); *G06K 9/6296* (2013.01); *G06N 3/04* (2013.01); *G06Q 40/08* (2013.01); *G06K 2209/23* (2013.01); *G06T 2207/20081* (2013.01); *G06T 2207/20084* (2013.01)

(58) Field of Classification Search
    CPC ............. G06K 9/00771; G06K 9/6247; G06K 9/6296; G06K 9/00825; G06K 2209/23; G06K 9/6278; G06K 9/6202; G06N 3/04; G06N 3/08; G06N 3/0454; G06Q 40/08
    See application file for complete search history.

(56) References Cited

FOREIGN PATENT DOCUMENTS

| | | |
|---|---|---|
| CN | 105354273 | 2/2016 |
| CN | 105654066 | 6/2016 |
| CN | 106295541 | 1/2017 |

* cited by examiner

METHOD AND DEVICE FOR VEHICLE IDENTIFICATION

CROSS-REFERENCE TO RELATED APPLICATIONS

The present application is the U.S. national stage of International Patent Application No. PCT/CN2018/074878, filed on Jan. 31, 2018, which claims the benefit of priority under 35 U.S.C. § 119 from a patent application filed in China on Feb. 16, 2017, with the application number of 201710083593.6 and the title of "method and device for vehicle identification". The content of the foregoing applications is incorporated herein by reference in its entirety.

TECHNICAL FIELD

The present application pertains to the technical field of image recognition, and particularly to a method and device for vehicle identification.

BACKGROUND

With the rapid development of automobile industry, vehicle population is becoming larger and larger, and there are more and more vehicles having the same or similar appearance. In some specific situations such as road vehicle monitoring, or automobile insurance loss assessment, a situation that a similarly designed vehicle is used as a fake-licensed vehicle or for insurance fraud occurs frequently. How to accurately determine whether a vehicle image photographed under certain condition is identical to a vehicle image photographed during a vehicle registration is the problem expected to be solved in the industry.

Aiming at the problem in the related art that similarly designed vehicles in a vehicle image can't be recognized, there is no ideal approach to solve this problem in the industry currently.

SUMMARY

The present application provides a vehicle identification method comprising:

obtaining a first vehicle image and a second vehicle image, wherein the first vehicle image comprises a first vehicle, and the second vehicle image comprises a second vehicle;

extracting a first color feature and a first vehicle type feature of the first vehicle, and extracting a second color feature and a second vehicle type feature of the second vehicle based on a convolutional neural network model;

combining the first color feature and the first vehicle type feature into a first vehicle feature, and combining the second color feature and the second vehicle type feature into a second vehicle feature;

calculating a similarity parameter between the first vehicle feature and the second vehicle feature; and determining whether the first vehicle is the same one as the second vehicle according to the similarity parameter.

The present application further provides a terminal device, comprising a memory, a processor, and a computer readable instruction stored in the memory and executable by the processor, wherein when executing the computer readable instruction, the processor implements following steps of:

obtaining a first vehicle image and a second vehicle image, wherein the first vehicle image comprises a first vehicle, and the second vehicle image comprises a second vehicle;

extracting a first color feature and a first vehicle type feature of the first vehicle, and extracting a second color feature and a second vehicle type feature of the second vehicle based on a convolutional neural network model;

combining the first color feature and the first vehicle type feature into a first vehicle feature, and combining the second color feature and the second vehicle type feature into a second vehicle feature;

calculating a similarity parameter between the first vehicle feature and the second vehicle feature; and determining whether the first vehicle is the same one as the second vehicle according to the similarity parameter.

In the present application, by taking the advantage of the convolution neural network model in the aspect of image feature extraction, by using the vehicle color feature and the vehicle type feature to perform a vehicle verification, and by digging out differences among the features through training the joint Bayesian model, so that whether the same vehicle is recorded in two images can be accurately recognized according to the vehicle images, and the robustness and the accuracy of vehicle identification are improved.

EMBODIMENTS OF THE PRESENT APPLICATION

In order to make the technical problem to be solved, the technical solution and the advantages of the present application be clearer and more understandable, the present application will be further described in detail below with reference to accompanying figures and embodiments. It should be understood that the specific embodiments described herein are merely intended to illustrate but not to limit the present application.

Figure 1:
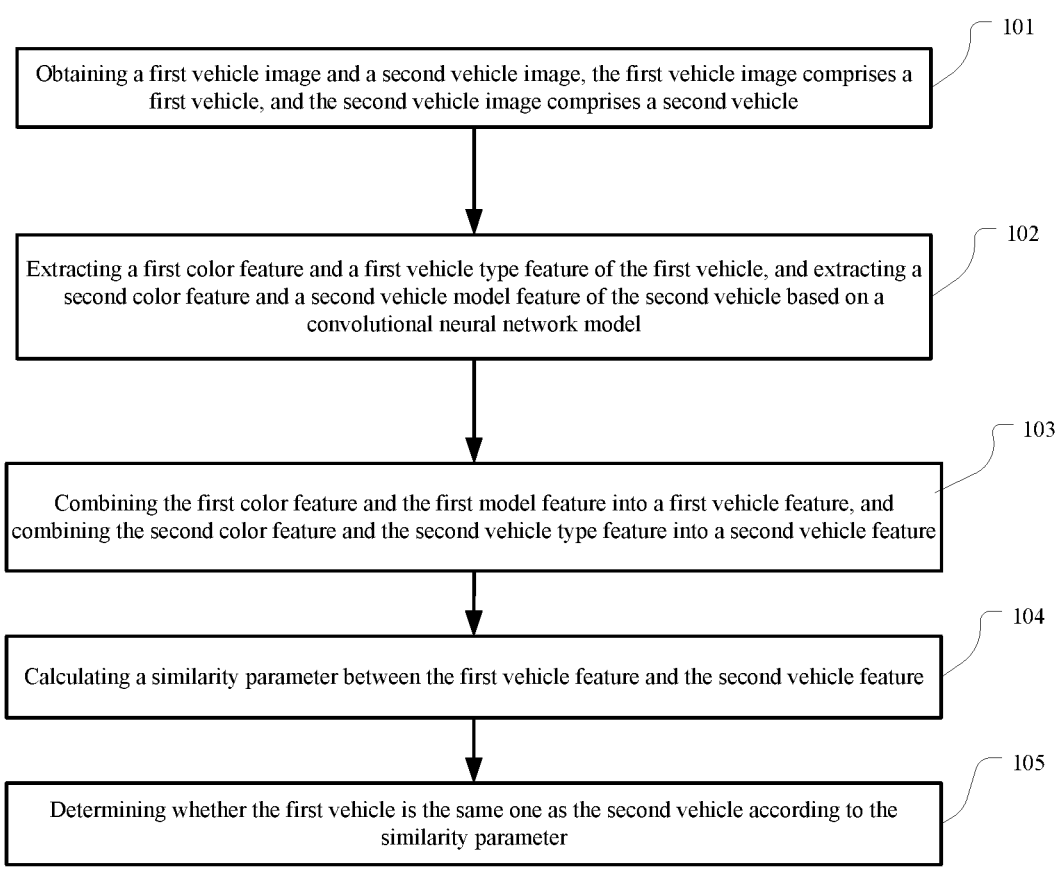
FIG. 1 illustrates a flow diagram of a vehicle identification method provided by an embodiment of the present application.

An embodiment of the present application provides a vehicle identification method, FIG. 1 illustrates a flow diagram of a vehicle identification method according to the embodiment of the present application; as shown in FIG. 1, the method particularly comprises steps 101-105 as follows:

in step 101, obtaining a first vehicle image and a second vehicle image, the first vehicle image comprises a first vehicle, and the second vehicle image comprises a second vehicle.

The first vehicle image is a vehicle image photographed under current condition, such as photographing of illegal vehicles of monitoring equipment, or photographing of damaged vehicles during traffic accidents. The second vehicle image is a vehicle image in registration of a new car, in a transfer ownership or in an annual verification of a vehicle. Whether the vehicle in the first vehicle image is a fake-licensed vehicle or not can be determined by comparing the first vehicle image with the second vehicle image.

In step 102, extracting a first color feature and a first vehicle type feature from the first vehicle, and extracting a second color feature and a second vehicle type feature from the second vehicle based on a convolutional neural network model.

The color and the model of the vehicle are two remarkable features of the vehicle, for this reason, vehicles are identified according to color features and vehicle type features.

Figure 2:
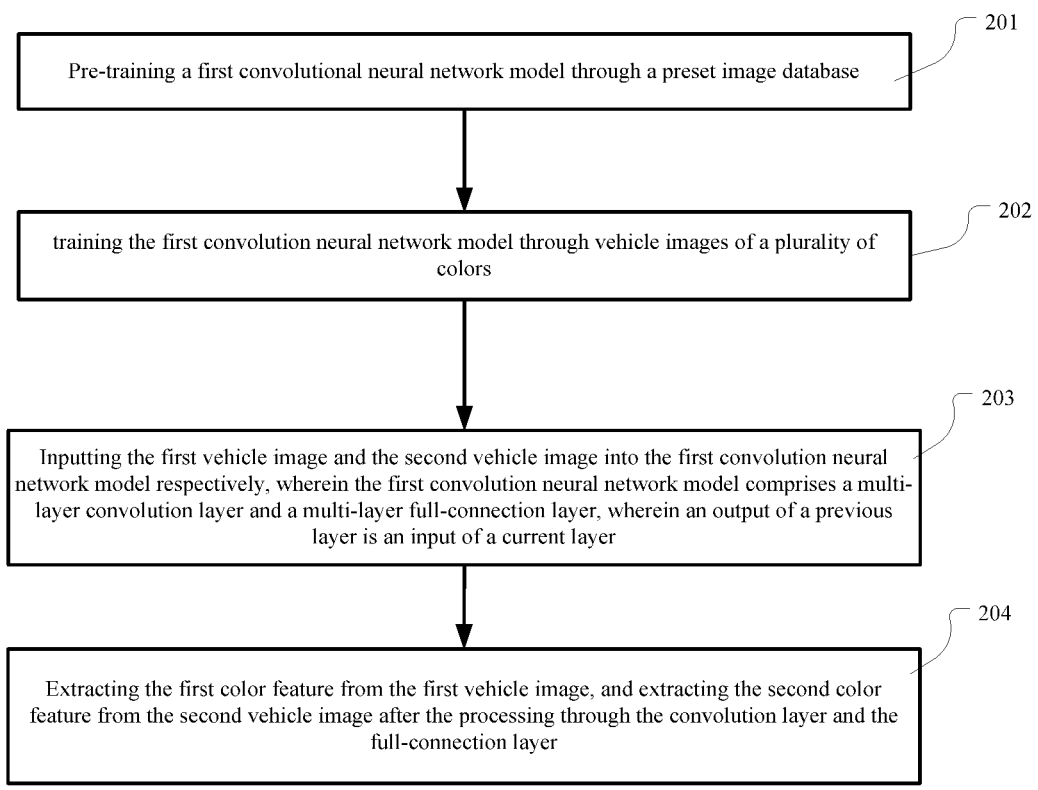
FIG. 2 illustrates a flow diagram of one method for extracting color features provided by an embodiment of the present application.

FIG. 2 illustrates a flow diagram of a method for extracting color features according to the present application, as shown in FIG. 2, the method comprises:

step 201, pre-training the first convolutional neural network model through a preset image database.

According to this embodiment, a CaffeNet model is taken as a first convolution neural network model, firstly, a million data set ImageNet which includes 1000 classifications can be used to perform a pre-training for the convolution neural network model.

Step 202, training the first convolutional neural network model according to vehicle images of a plurality of colors.

According to the embodiment, vehicle colors can be classified into 9 types, that is, black, white, gray, red, blue, green, orange, yellow and purple. In other embodiments, classification accuracy can be improved or reduced according to other classification methods, however, an effect similar to that in this embodiment can be achieved. The vehicles with 9 different colors are identified, and the color features of the vehicles are extracted, an area where a vehicle is located is merely identified by the first convolution neural network model, such that the color and the model of the vehicle can be identified under the condition of interference preclusion.

Step 203, inputting a first vehicle image and the second vehicle image into the first convolution neural network model respectively, the first convolution neural network model comprises a multi-layer convolution layer and a multi-layer full-connection layer, and an output of a previous layer is an input of a current layer.

The CaffeNet model may include a five-layer convolution layer and a three-layer full-connection layer, according to layer-by-layer feature transformation, low-layer features are combined to form more abstract high-layer features used for representing a color feature of the vehicle, then, the model is adjusted by using vehicle data of 9 different colors.

Step 204, after the convolution layer and the full-connection layer are processed, extracting a first color feature from the first vehicle image, and extracting a second color feature from the second vehicle image.

In this step, an output dimension of a last classification layer can be set to be 9 firstly, and then a learning rate is gradually reduced with the increase of the number of iterations according to an exponential decay mode (the learning rate is divided by 10 for every 50,000 iterations), so that the model is converged more stably; lastly, the feature of the second layer of the full-connection layer is extracted and taken as the color feature.

Generally, the extracted color feature has 4096 dimensionalities, a larger calculated amount may be caused due to a higher dimensionality, thus, a dimensionality reduction processing can be performed through one PCA (Principal Component Analysis) conversion after the color features are obtained.

Figure 3:
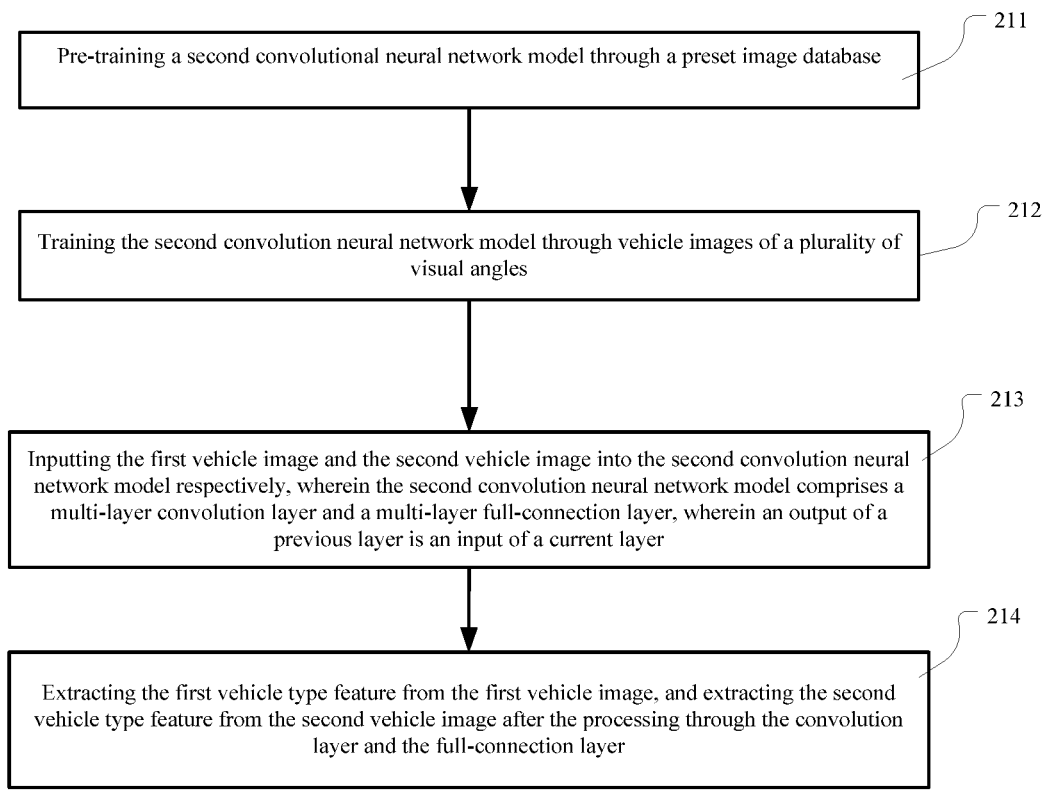
FIG. 3 illustrates a flow diagram of another method for extracting color features provided by an embodiment of the present application.

FIG. 3 is a flow diagram of a method for extracting color features provided by the present application, as shown in FIG. 3, the method comprises:

Step 211, pre-training the second convolutional neural network model through a preset image database.

According to the embodiment, a GoogleNet model is used as the second convolution neural network model for classification of vehicles, firstly, the GoogleNet model is pre-trained by using a million data set ImageNet which includes 1000 classifications; then, the model is corrected and finely adjusted through 1716 vehicle models of 163 mainstream vehicle brands. Wherein, vehicle data structure is a three-layer tree data structure and includes vehicle brands, vehicle models and vehicle delivery time. Vehicles which are produced in different years and have slight difference are classified into the same category.

In step 212, training the second convolution neural network model according to vehicle images having many visual angles.

According to the embodiment of the present application, a large number of vehicle samples having different visual angles are adopted to train the GoogleNet model, such that features of vehicle won't be influenced by an observation angle. Each type of vehicle includes five pictures with different visual angles, that is, the front part, the rear part, the side part, the front side part and the rear side part.

In step 213, inputting the first vehicle image and the second vehicle image into the second convolution neural network model respectively, the second convolution neural network model comprises a multi-layer convolution layer and a multi-layer full-connection layer, and an output of a previous layer is an input of a current layer.

The GoogleNet model has 22 layers, and it uses network in network to improve the depth and the width of the network, and reduces a computational bottleneck by reducing feature dimensionalities. The aforesaid 1716 vehicle models of the 163 mainstream vehicle brands cover most common vehicle types basically; in other embodiments, a larger sample can be selected, a method as same as that in this embodiment is used in the larger sample, and more accurate results can be obtained to a certain extent.

Step 214, extracting the first vehicle type feature from the first vehicle picture, and extracting the second vehicle type feature from the second vehicle picture after the convolution layer and the full-connection layer are processed.

According to this embodiment, the GoogleNet model is pre-trained by using a million data set ImageNet which includes 1000 classifications; and then, the 1716 vehicle models of 163 mainstream vehicle brands are used to adjust the model finely; and finally, the feature of pool 5 layer is extracted from a pooling layer and serve as a vehicle type feature.

Step 103, combining the first color feature and the first vehicle type feature into a first vehicle feature, and combining the second color feature and the second vehicle type feature into the second vehicle feature.

Figure 4:
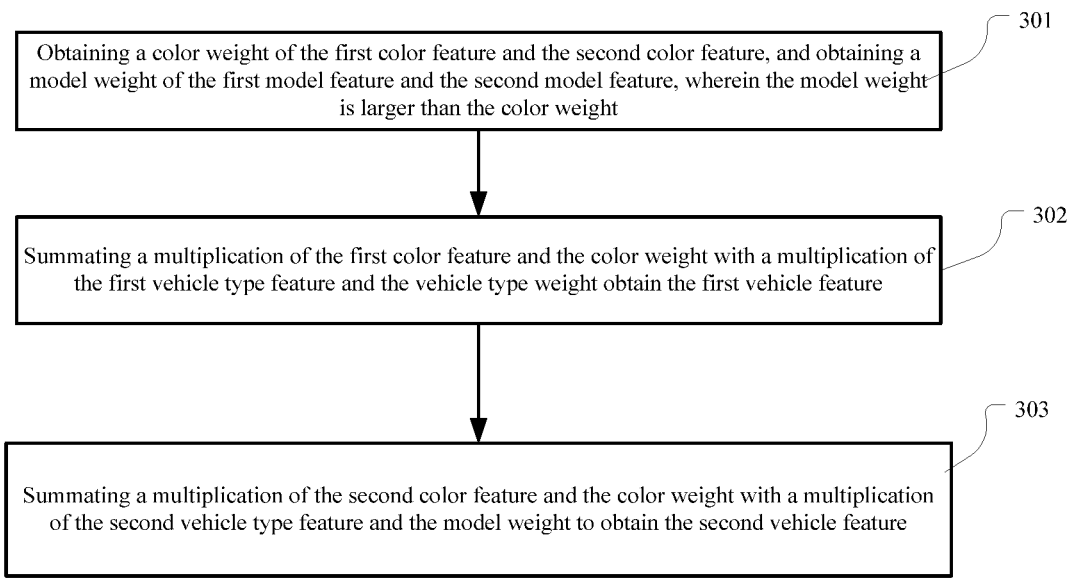
FIG. 4 illustrates a flow diagram of a method for combining features provided by an embodiment of the present application.

After the two aspects of features are obtained respectively, different features are combined in the embodiment so as to reflect vehicle features comprehensively. FIG. 4 illustrates a flow diagram of a feature combining method provided by an embodiment of the present application, as shown in FIG. 4, the method comprises:

In step 301, obtaining a color weight of the first color feature and the second color feature, and a vehicle type weight of the first vehicle type feature and the second vehicle type feature, the vehicle type weight is larger than the color weight.

Because that a discrimination of the model is larger than a discrimination of the color weight, the weight of the type is higher than the weight of the color.

Step 302, summating a multiplication of the first color feature and the color weight with a multiplication of the first vehicle type feature and the vehicle type weight to obtain the first vehicle feature.

Step 303, multiplying the second color feature by a color weight plus a second and the vehicle type feature is multiplied by the type weight to obtain the second vehicle characteristic.

Both the color feature and the vehicle type feature are embodied in the form of vector. The combined vehicle feature is also a vector. According to the embodiment, the accuracy can be improved and the calculation amount can be reduced by using PCA dimensionality reduction to process the vehicle feature.

In step s104, calculating similarity parameter of the first vehicle feature and the second vehicle feature.

As a preferred implementation mode of this embodiment, the similarity parameter between the first vehicle feature and the second vehicle feature is obtained based on selected joint Bayesian model, which, in particular, comprises following steps:

Step 1, dividing the vehicle features into two parts, that is, identity and intra-car variation, identity is used to identify different vehicles, intra-car variation is used to identify variations of the same car at different time and in different environments, the identity and the intra-car variation are respectively represented as μ and ε, then, a vehicle x can be presented as x=μ+ε. The two potential variations μ and ε comply with two Gaussian distributions $N(0, S_\mu)$ and $N(0, S_\varepsilon)$ respectively.

Step 2, extracting a vehicle type feature $x_1$ and a color feature $x_2$, particularly, in this embodiment, 128 dimensional vectors output by a vehicle model classification depth convolution neural network output layer are taken as the extracted vehicle type feature. An output of fc8 full connection layer of vehicle color classification network based on a depth convolution neural network is taken as the vehicle color feature. On this basis, a Gaussian joint distribution $\{x_1, x_2\}$ having an average value of 0 can be obtained, if μ and ε are independent from each other, characteristic covariance of two vehicles can be obtained, which is listed as follows:

$$\text{cov}(x_1, x_2) = \text{cov}(\mu_1, \mu_2) + \text{cov}(\varepsilon_1, \varepsilon_2)$$

At the premise of hypothesis $H_I$, even if two pictures belong to the same objective, $\mu_1, \mu_2$ are identical, $\varepsilon_1, \varepsilon_2$ are independent, thus, a covariance matrix of distribution $P(x_1, x_2|H_I)$ is formulized as follows:

$$\sum\nolimits_I \begin{bmatrix} S_\mu + S_\varepsilon & S_\mu \\ S_\mu & S_\mu + S_\varepsilon \end{bmatrix}$$

At the premise of hypothesis $H_E$, that is, two pictures belong to different objectives, μ and ε are independent, a covariance matrix of distribution $P(x_1, x_2|H_I)$ is formulized as follows:

$$\sum\nolimits_E \begin{bmatrix} S_\mu + S_\varepsilon & 0 \\ 0 & S_\mu + S_\varepsilon \end{bmatrix}$$

In the presence of a joint probability under the two conditions mentioned above, a corresponding log-likelihood ratio $r(x_1, x_2)$ can be obtained after conversion, which is listed as follows:

$$r(x_1, x_2) = \log \frac{P(x_1, x_2 | H_I)}{P(x_1, x_2 | H_E)} = x_1^T A x_1 + x_2^T A x_2 - 2 x_1^T G x_2$$

Wherein $A = (S_\mu + S_\varepsilon)^{-1} - (F + G)$, $$\begin{pmatrix} F+G & G \\ G & F+G \end{pmatrix} = \begin{pmatrix} S_\mu + S_\varepsilon & S_\mu \\ S_\mu & S_\mu + S_\varepsilon \end{pmatrix}^{-1},$$

Since $S_\mu$, $S_\varepsilon$ can estimate probability distributions of random variables $S_\mu$, $S_\varepsilon$ by sampling in the data set uninterruptedly, and further obtain a standard deviation of the two probability distributions, that is, $S_\mu$, $S_\varepsilon$, therefore, the left of the equation can be taken as known, the concrete value of matrix F and G can be solved by a numerical optimized matrix solution equation set method; then, the value of matrix A is calculated by the solved value of matrix F and G; lastly, matrix A and G are substituted into $r(x_1, x_2)$ to solve the value of $(x_1, x_2)$ by solving the expression.

Step 3, estimating the optimized matrix A and G according to EM (Expectation Maximization) algorithm training model, and obtaining a similarity parameter r between two vehicles by solving $r(x_1, x_2)$.

Step 105, determining whether the first vehicle is the same one as the second vehicle.

In this step, whether the first vehicle is the same one as the second vehicle can be determined by comparing the similarity parameter with a preset threshold value. The preset threshold value in the embodiment can be set as −450, the selection of the threshold value is mainly dependent on a continuous test on the data set, and a subsequent selection of the effect that is the best.

After the preset threshold value is obtained, when the similarity parameter is larger than or equal to the preset threshold value, the first vehicle is determined to be the same one as the second vehicle; when the similarity parameter is smaller than a preset threshold value, the first vehicle is determined not to be the same one as the second vehicle.

In this embodiment, by taking the advantage of the convolution neural network model in the aspect of image feature extraction, by using the vehicle color feature and the vehicle type feature to perform a vehicle verification, and by digging out differences among the features through training the joint Bayesian model, so that whether the same vehicle is recorded in two images can be accurately recognized according to the vehicle images, and the robustness and the accuracy of vehicle identification are improved.

Figure 5:
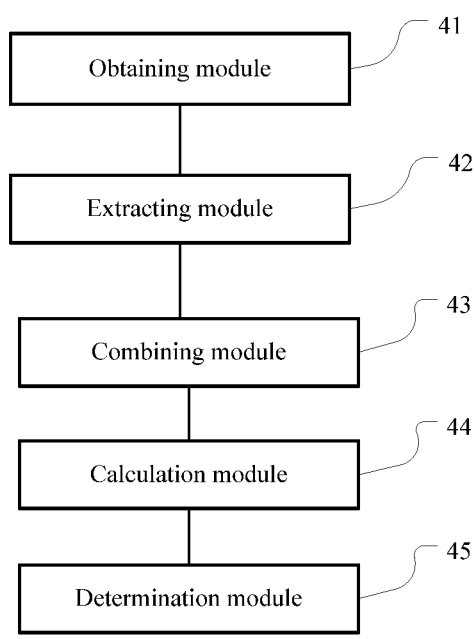
FIG. 5 illustrates a structural block diagram of a vehicle identification device provided by an embodiment of the present application.

The embodiment of the present application further provides a vehicle identification device, FIG. 5 illustrates a structural block diagram of the vehicle identification device provided by an embodiment of the present application, as shown in FIG. 5, this device comprises an obtaining module 41, an extracting module 42, a combining module 43, a calculation module 44 and a determination module 450.

The obtaining module 41 is configured to obtain a first vehicle image and a second vehicle image, the first vehicle image comprises a first vehicle, and the second vehicle image comprises a second vehicle.

The extracting module 42 is configured to extract a first color feature and a first vehicle type feature of the first vehicle, and extract a second color feature and a second vehicle type feature of the second vehicle based on a convolutional neural network model.

The combining module 43 is configured to combine the first color feature and the first vehicle type feature into a first vehicle feature, and combine the second color feature and the second vehicle type feature into a second vehicle feature.

The calculation module 44 is configured to calculate a similarity parameter between the first vehicle feature and the second vehicle feature.

The determination module 44 is configured to determine whether the first vehicle is the same one as the second vehicle according to the similarity parameter.

Preferably, the extracting module 42 comprises: a first training unit configured to pre-train a first convolutional neural network model through a preset image database; a second training unit configured to train the first convolution neural network model through vehicle images of a plurality of colors; a first inputting unit configured to input the first vehicle image and the second vehicle image into the first convolution neural network model respectively, wherein the first convolution neural network model comprises a multi-layer convolution layer and a multi-layer full-connection layer, and an output of a previous layer is an input of a current layer; and a first extracting unit configured to extract the first color feature from the first vehicle image, and extract the second color feature from the second vehicle image after the processing through the convolution layer and the full-connection layer.

Preferably, the extracting module 42 further comprises: a third training unit configured to pre-train a second convolutional neural network model through a preset image database; a fourth training unit configured to train the second convolution neural network model through vehicle images of a plurality of visual angles; a second inputting unit configured to input the first vehicle image and the second vehicle image into the second convolution neural network model respectively, wherein the second convolution neural network model comprises a multi-layer convolution layer and a multi-layer full-connection layer, and an output of a previous layer is an input of a current layer; and a second extracting unit configured to extract the first vehicle type feature from the first vehicle image, and extract the second vehicle type feature from the second vehicle image after the processing through the convolution layer and the full-connection layer.

Preferably, the combining module 43 comprises: a first obtaining unit configured to obtain a color weight of the first color feature and the second color feature, and obtain a vehicle type weight of the first vehicle type feature and the second vehicle type feature, wherein the vehicle type weight is larger than the color weight; a first weighting unit configured to summate a multiplication of the first color feature and the color weight, with a multiplication of the first vehicle type feature and the vehicle type weight to obtain the first vehicle feature; and a second weighting unit configured to summate a multiplication of the second color feature and the color weight with a multiplication of the second vehicle type feature and the vehicle type weight to obtain the second vehicle feature.

Preferably, the calculation module 44 comprises: a second obtaining unit configured to obtain the similarity parameter between the first vehicle feature and the second vehicle feature based on a joint Bayesian model.

Preferably, the determination module 45 comprises: a third obtaining unit configured to obtain a preset threshold value; a first determining unit configured to determine that the first vehicle is the same one as the second vehicle when the similarity parameter is larger than or equal to the preset threshold value; and
a second determining unit configured to determine that the first vehicle is not the same one as the second vehicle when the similarity parameter is smaller than the preset threshold value.

What is claimed is:

1. A vehicle identification method, comprising:
obtaining a first vehicle image and a second vehicle image, wherein the first vehicle image comprises a first vehicle, and the second vehicle image comprises a second vehicle;
extracting a first color feature and a first vehicle type feature of the first vehicle, and extracting a second color feature and a second vehicle type feature of the second vehicle based on a convolutional neural network model;
combining the first color feature and the first vehicle type feature into a first vehicle feature, and combining the second color feature and the second vehicle type feature into a second vehicle feature;
calculating a similarity parameter between the first vehicle feature and the second vehicle feature; and
determining whether the first vehicle is the same one as the second vehicle according to the similarity parameter;
wherein the step of extracting a first color feature and a first vehicle type feature of the first vehicle, and a second color feature and a second vehicle type feature of the second vehicle based on a convolutional neural network model, comprises:
pre-training a first convolutional neural network model through a preset image database;
training the first convolution neural network model through vehicle images of a plurality of colors;
inputting the first vehicle image and the second vehicle image into the first convolution neural network model respectively, wherein the first convolution neural network model comprises a multi-layer convolution layer and a multi-layer full-connection layer, wherein an output of a previous layer is an input of a current layer; and
extracting the first color feature from the first vehicle image and extracting the second color feature from the second vehicle image, after the processing through the convolution layer and the full-connection layer.

2. The method according to claim 1, wherein the step of extracting a first color feature and a first vehicle type feature of the first vehicle and a second color feature and a second vehicle type feature of the second vehicle based on a convolutional neural network model further comprises:
pre-training a second convolutional neural network model through a preset image database;
training the second convolution neural network model through vehicle images of a plurality of visual angles;
inputting the first vehicle image and the second vehicle image into the second convolution neural network model respectively, wherein the second convolution neural network model comprises a multi-layer convolution layer and a multi-layer full-connection layer, and an output of a previous layer is an input of a current layer; and
extracting the first vehicle type feature from the first vehicle image, and extracting the second vehicle type feature from the second vehicle image after the processing through the convolution layer and the full-connection layer.

3. The method according to claim 1, wherein the step of combining the first color feature and the first vehicle type feature into a first vehicle feature and combining the second color feature and the second vehicle type feature into a second vehicle feature comprises:
  obtaining a color weight of the first color feature and the second color feature, and obtaining a vehicle type weight of the first vehicle type feature and the second vehicle type feature, wherein the vehicle type weight is larger than the color weight;
  summating a multiplication of the first color feature and the color weight with a multiplication of the first vehicle type feature and the vehicle type weight to obtain the first vehicle feature; and
  summating a multiplication of the second color feature and the color weight with a multiplication of the second vehicle type feature and the vehicle type weight to obtain the second vehicle feature.

4. The method according to claim 1, wherein the step of determining whether the first vehicle is the same one as the second vehicle according to the similarity parameter comprises:
  obtaining a preset threshold value;
  determining that the first vehicle is the same one as the second vehicle when the similarity parameter is larger than or equal to the preset threshold value; or
  determining that the first vehicle is not the same one as the second vehicle when the similarity parameter is smaller than the preset threshold value.

5. A terminal device comprising a memory, a processor, and a computer readable instruction stored in the memory and executable by the processor, wherein when executing the computer readable instruction, the processor implements following steps of:
  obtaining a first vehicle image and a second vehicle image, wherein the first vehicle image comprises a first vehicle, and the second vehicle image comprises a second vehicle;
  extracting a first color feature and a first vehicle type feature of the first vehicle, and extracting a second color feature and a second vehicle type feature of the second vehicle based on a convolutional neural network model;
  combining the first color feature and the first vehicle type feature into a first vehicle feature, and combining the second color feature and the second vehicle type feature into a second vehicle feature;
  calculating a similarity parameter between the first vehicle feature and the second vehicle feature; and
  determining whether the first vehicle is the same one as the second vehicle according to the similarity parameter;
  wherein the step of extracting a first color feature and a first vehicle type feature of the first vehicle and a second color feature and a second vehicle type feature of the second vehicle based on a convolutional neural network model comprises:
  pre-training a first convolutional neural network model through a preset image database;
  training the first convolution neural network model through vehicle images of a plurality of colors;
  inputting the first vehicle image and the second vehicle image into the first convolution neural network model respectively, wherein the first convolution neural network model comprises a multi-layer convolution layer and a multi-layer full-connection layer, and an output of a previous layer is an input of a current layer; and
  extracting the first color feature from the first vehicle image, and extracting the second color feature from the second vehicle image after the processing through the convolution layer and the full-connection layer.

6. The terminal device according to claim 5, wherein the step of extracting a first color feature and a first vehicle type feature of the first vehicle and a second color feature and a second vehicle type feature of the second vehicle based on a convolutional neural network model further comprises:
  pre-training a second convolutional neural network model through a preset image database;
  training the second convolution neural network model through vehicle images of a plurality of visual angles;
  inputting the first vehicle image and the second vehicle image into the second convolution neural network model respectively, wherein the second convolution neural network model comprises a multi-layer convolution layer and a multi-layer full-connection layer, and an output of a previous layer is an input of a current layer; and
  extracting the first vehicle type feature from the first vehicle image, and extracting the second vehicle type feature from the second vehicle image after the processing through the convolution layer and the full-connection layer.

7. The terminal device according to claim 5, wherein the step of combining the first color feature and the first vehicle type feature into a first vehicle feature and combining the second color feature and the second vehicle type feature into a second vehicle feature comprises:
  obtaining a color weight of the first color feature and the second color feature, and obtaining a vehicle type weight of the first vehicle type feature and the second vehicle type feature, wherein the vehicle type weight is larger than the color weight;
  summating a multiplication of the first color feature and the color weight with a multiplication of the first vehicle type feature and the vehicle type weight to obtain the first vehicle feature; and
  summating a multiplication of the second color feature and the color weight with a multiplication of the second vehicle type feature and the vehicle type weight to obtain the second vehicle feature.

8. The terminal device according to claim 5, wherein the step of determining whether the first vehicle is the same one as the second vehicle according to the similarity parameter comprises:
  obtaining a preset threshold value;
  determining that the first vehicle is the same one as the second vehicle when the similarity parameter is larger than or equal to the preset threshold value; or
  determining that the first vehicle is not the same one as the second vehicle when the similarity parameter is smaller than the preset threshold value.

* * * * *